United States Patent
Glodde et al.

(10) Patent No.: US 11,479,437 B2
(45) Date of Patent: Oct. 25, 2022

(54) METHOD AND APPARATUS FOR ZIGZAG FOLDING A MATERIAL WEB

(71) Applicant: TECHNISCHE UNIVERSITÄT BERLIN, Berlin (DE)

(72) Inventors: Arne Glodde, Berlin (DE); Gordon Bach, Berlin (DE); Robert Mooy, Wunstorf (DE); Muhammed Aydemir, Berlin (DE)

(73) Assignee: TECHNISCHE UNIVERSITÄT BERLIN, Berlin (DE)

(*) Notice: Subject to any disclaimer, the term of this patent is extended or adjusted under 35 U.S.C. 154(b) by 425 days.

(21) Appl. No.: 15/578,568

(22) PCT Filed: Jun. 1, 2016

(86) PCT No.: PCT/DE2016/100253
§ 371 (c)(1),
(2) Date: Nov. 30, 2017

(87) PCT Pub. No.: WO2016/192717
PCT Pub. Date: Dec. 8, 2016

(65) Prior Publication Data
US 2018/0170705 A1    Jun. 21, 2018

(30) Foreign Application Priority Data
Jun. 1, 2015    (DE) .................... 10 2015 108 651.4

(51) Int. Cl.
*B65H 45/101*    (2006.01)
*H01M 10/04*    (2006.01)
(Continued)

(52) U.S. Cl.
CPC ....... *B65H 45/1015* (2013.01); *B65H 45/101* (2013.01); *H01M 10/0404* (2013.01);
(Continued)

(58) Field of Classification Search
CPC ............. B65H 45/1015; B65H 45/101; B65H 2301/44331; B65H 2301/44338;
(Continued)

(56) References Cited

U.S. PATENT DOCUMENTS 1,109,296 A *   9/1914   Lewis ................ B65H 45/1015
                                                  493/410
3,784,188 A *   1/1974   De Ligt .................. B26D 1/02
                                                   493/358
(Continued)

FOREIGN PATENT DOCUMENTS

DE         2634300 A1    2/1977
DE    102010055608 A1    6/2012
(Continued)

OTHER PUBLICATIONS

International Search Report (in English and German) and Written Opinion of the International Searching Authority (in German) issued in PCT/DE2016/100253, dated Nov. 4, 2016; ISA/EP.

(Continued)

*Primary Examiner* — Sameh Tawfik (57) ABSTRACT

The application relates to a method for zigzag folding a material web, the method having the following steps: continuously feeding a material web to be folded into a folding apparatus along a feed direction, alternately gripping the material web in a proximal region of the folding apparatus by means of gripping devices, holding and conveying the material web by means of the gripping devices into a distal region of the folding apparatus, the material web being zigzag folded thereby, and releasing the material web from the gripping devices and depositing the material web in a stack (9) with folds in the distal region, a distance between adjacent gripping devices (4, 5) being equal to a fold length. Furthermore, the application also relates to an apparatus for zigzag folding a material web.

7 Claims, 6 Drawing Sheets

(51) Int. Cl.
  *H01M 10/0583* (2010.01)
  *H01M 10/0525* (2010.01)
  *B31D 5/00* (2017.01)
  *B31F 1/00* (2006.01)

(52) U.S. Cl.
  CPC ... *H01M 10/0459* (2013.01); *H01M 10/0525* (2013.01); *H01M 10/0583* (2013.01); *B31D 5/00* (2013.01); *B31F 1/0025* (2013.01); *B65H 2301/44331* (2013.01); *B65H 2301/44338* (2013.01); *B65H 2405/552* (2013.01)

(58) Field of Classification Search
  CPC ........ B65H 2405/552; H01M 10/0404; H01M 10/0459; H01M 10/0525; H01M 10/0583; B31D 5/00; B31D 5/006; B31D 5/0069; B31F 1/0022; B31F 1/0025; B31F 1/16; B31F 1/20; B31F 1/2836
  USPC ........................................................ 493/422
  See application file for complete search history.

(56) References Cited

U.S. PATENT DOCUMENTS

| | | | | |
|---|---|---|---|---|
| 3,904,186 | A * | 9/1975 | De Ligt | B65H 45/20 493/422 |
| 3,947,013 | A * | 3/1976 | Nystrand | B65H 45/20 493/422 |
| 4,080,728 | A | 3/1978 | Buckler | |
| 4,406,057 | A * | 9/1983 | Oswald | H01M 2/18 29/623.4 |
| 4,479,300 | A | 10/1984 | Savage | |
| 4,604,794 | A * | 8/1986 | Marui | H01M 2/18 29/623.1 |
| 4,874,457 | A * | 10/1989 | Swieringa | B31F 1/30 156/474 |
| 5,248,291 | A * | 9/1993 | DeNoon | B65H 45/1015 493/410 |
| 6,287,721 | B1 * | 9/2001 | Xie | H01M 2/266 429/152 |
| 8,808,922 | B2 * | 8/2014 | Ahn | H01M 2/021 429/152 |
| 2014/0101928 | A1 | 4/2014 | Sato et al. | |

FOREIGN PATENT DOCUMENTS

| | | |
|---|---|---|
| DE | 102010055611 A1 | 6/2012 |
| DE | 102010055617 A1 | 6/2012 |
| DE | 102012022751 B4 | 9/2014 |
| JP | 62-21680 B2 | 11/2017 |
| WO | WO-2012144008 A1 | 10/2012 |

OTHER PUBLICATIONS

Office Action issued in counterpart Chinese Application No. 201680031723.5 dated Jun. 11, 2020.

* cited by examiner

METHOD AND APPARATUS FOR ZIGZAG FOLDING A MATERIAL WEB

CROSS REFERENCE TO RELATED APPLICATIONS

This application is a U.S. National Phase Application under 35 U.S.C. 371 of International Application No. PCT/DE2016/100253 filed on Jun. 1, 2016 and published in German as WO 2016/192717 A1 on Dec. 8, 2016. This application is based on and claims the benefit of priority from German Patent Application No. 10 2015 108 651.4 filed Jun. 1, 2015. The entire disclosures of all of the above applications are incorporated herein by reference.

The invention relates to a method and an apparatus for zigzag folding a strip material.

BACKGROUND

Methods of this type for zigzag folding a strip material can be used in various applications, inserts can be arranged in the folds of the folded strip material, whether it be in all folds or only in a portion of the folds. A method for zigzag folding can for example be used in connection with the production of a cell composite of battery cells.

Cell production of this type knows multiple different cell cores, for example for the construction of lithium-ion battery cells. However, these generally differ in terms of the composition of their individual components, an electrode separator composite (cell composite), not from one another. The composite structure of the cell core constitutes the structural design by means of the different production methods. In the general prior art, a distinction is made between four composite structures: The round-wound and the prismatically-wound composite structure, the stacked structure and the zigzag-folded composite structure.

The round-wound composite structure generally consists of a cathode and anode web, which is wound together with two separators. The flat-wound composite structure differs from the round-wound composite structure by a flat winding core with ellipsoidal shape.

The folded composite structure is based on the use of a regularly zigzag-folded continuous separator strip, into which preassembled electrode sheets are alternately introduced. It is known from DE 10 2010 055 611 A1 to only provide anodes and cathodes as pre-cut sheets, and instead to provide the separator and pre-fold the same to the dimensions of the finished stack. US 2014/0101928 A1 describes an opposing shift register for creating a zigzag fold with simultaneous introduction of many electrode sheets during folding. A method for producing an electrode stack made up of cathode, anode and separator for a battery is described in DE 10 2010 055 617 A1. At least one of these components, generally the separator, is present as a continuous material. The separator material is supplied unfolded and equipped with at least one tailored component. Subsequently, this composite is folded with electrodes already placed and fixed. This method therefore differs from DE 10 2010 055 611.4 in that the separator is not already provided as a pre-folded continuous material. This therefore overcomes the problems of the dimensional accuracy of the separator owing to extensions/shrinkages in the pre-folded state.

DE 10 2010 055 608 A1 describes a method for producing an electrode stack, in which a layer of the electrode stack is present as a continuous material and is folded alternately. The two other layers are inserted into the pockets produced by the folding. The folding is created by means of arrangement of boundary rods, between which the material is introduced. The rods are subsequently pulled out laterally. The design of the zigzag-folded cell core is characterized by a continuous separator with either electrodes which are already place, or with electrodes subsequently inserted into the folds.

The design of stacked cell composites essentially differ, due to the sheet-like design of the separator material, from those of the wound and folded composite structures, in which the separator is generally present in a strip-shaped manner. A method for stacking individual layers for producing a battery cell is described in U.S. Pat. No. 4,080,728 A. Here, all constituents of the cell core are joined as cut individual elements to form a stack.

Like the stacking method, the folding method also counts among the oldest of composite production. In 1984 already, a method for continuous composite production was presented in U.S. Pat. No. 4,479,300 A. Here, electrode sheets are inserted alternately into the folds of an already continuously folded separator strip. Due to the high process throughputs and the high composite quality of winding methods, predominantly round cells were produced in the commercialization of lithium-ion battery cells in the year 1990. However, since 2000, the demand for compact, flat lithium-ion battery cells increased again due to the miniaturization of electronic devices. As a result, the focus of industrialized production technology returned to the automation of the folding or stacking composite production.

But also in connection with other applications, there is a need for improved technologies for folding.

A method and an apparatus for placing a flexible strip material are specified in the document DE 10 2012 022 751 B4, wherein the strip material is supplied by means of a supply device and placed in a zigzag-shaped manner on a placement position by means of a laying device, wherein the strip material is contacted by at least two engagement elements of the laying device, which can be moved in at least two opposing laying directions, after exiting the supply device, and is guided to the placement position. The engagement elements change their position during the contact with the strip material between an engagement position and a release position. During the transport, the strip material rolls on a contact section of the engagement element.

An apparatus for folding and stacking printed paper is described in the document DE 26 34 300 A1. Measures are provided for constantly pressing down the placed paper in the region of the folded edges.

SUMMARY

It is the object of the invention to specify a method and an apparatus for zigzag folding a strip material, enabling continuous folding with the highest possible throughput.

To achieve this, a method and an apparatus for zigzag folding a strip material with inserts arranged in folds are provided.

According to one aspect, a method is created for zigzag folding a strip material, in which a strip material to be folded is supplied continuously to a folding apparatus along a supply direction. The strip material is gripped alternately in a proximal region of the folding apparatus by means of gripping devices, wherein the gripping devices are guided from opposite sides of the strip material and spaced apart to the proximal region. The strip material is held by means of the gripping devices and transported into a distal region of the folding apparatus, wherein the strip material is zigzag folded at the same time. In the distal region, the strip material is released by the gripping devices and placed in a stack with folds, wherein the folds extend in the stack transversely to the supply direction. For each of the gripping devices, one straight connecting line runs diagonally to the supply direction on the opposite sides of the strip material, between a proximal position of the gripping device during gripping of the strip material in the proximal region and a distal position of the same gripping device during the release of the strip material in the distal region. A spacing between adjacent gripping devices, which successively grip the strip material to be folded during the gripping of the same, corresponds to a folding length, that is to say the spacing between successive folds along the zigzag-folded strip material.

According to a further aspect, an apparatus is provided for zigzag folding a strip material. The apparatus has a supply device, which is configured to supply a strip material to be folded to a folding apparatus along a supply direction. Gripping devices are provided, which are configured to grip the strip material in a proximal region of the folding apparatus, to hold the strip material and transport the same into a distal region of the folding apparatus, wherein the strip material is zigzag folded at the same time, and to release from the strip material and place the strip material in a stack with folds in the distal region. The gripping devices are guided by means of a transport device from opposite sides of the strip material, and spaced apart, to the proximal region. Folds extend transversely to the supply direction in the stack of the placed strip material. For each of the gripping devices, one straight connecting line runs diagonally to the supply direction on the opposite sides of the strip material, between a proximal position of the gripping device during gripping of the strip material in the proximal region and a distal position of the same gripping device during the release of the strip material in the distal region. A spacing between adjacent gripping devices, which successively grip the strip material to be folded during the gripping of the same, corresponds to a folding length, that is to say the spacing between successive folds along the zigzag-folded strip material.

The gripping and the holding of the strip material may be realized by means of gripper elements of the gripping device.

The gripping devices grip the strip material to be gripped successively at a spacing, which corresponds to the fold length, so that the spacing between adjacent gripping positions (adjacent gripping device) along the strip material, which extends in a straight line, that is to say positions, in which the strip material is gripped by a respective gripping device, is equal to the fold length.

Here, it is not necessary that the strip material to be folded extends in the stretched position (along a straight line), during gripping nor during transport into the placed position after gripping. The course of the strip material may deviate from such a straight position, for example sag. In any case, the dimension of the spacing of adjacent gripping devices corresponds to the fold length when the strip material extends along a (possibly imaginary) straight line.

A spacing between successive gripping devices during the movement thereof along a movement path may be set before operation, for example by using adjustable gripping devices, in which the relative position with respect to the adjacent gripping devices may be changed. The set spacing is then fixed for operation, namely to the fold length.

The straight connecting lines on the two sides of the strip material may be arranged in accordance with a V position. An angle between the supply direction and the respective straight connecting line may be an acute angle. The angle between the two straight connecting lines may be acute.

A supply speed for supplying the strip material to be folded, which may be realized in a clocked manner, and also a transport speed for transporting the gripping devices to the proximal region may be adjustable independently of one another. The supply speed and the transport speed may be adapted to one another.

The strip material to be folded is gripped by means of the gripping devices and held during the displacement of the gripping devices to the proximal region. For example, during gripping, the strip material is clamped between gripping arms or held by means of a friction fit. Thus, no relative movement takes place between a gripped strip material section and the gripping device during transport, particularly in relation to their active gripping or gripper elements.

The gripping devices may each be guided on the opposite sides of the strip material, between the proximal position and the distal position, at least in sections, along a movement path which runs along the straight connecting line. This may mean that the transport device, using which the gripping devices are each transported and guided on the opposite sides of the strip material between the proximal and the distal position, has a straight course (movement path) entirely or in part between the two positions.

The gripping devices may be guided on the opposite sides of the strip material by means of a respective transport device on a closed movement path from the proximal region, via the distal region, back again to the proximal region. The closed movement path of the respective transport device may have curved and straight movement paths. For example, an oval movement path may be provided, in which at least on one longitudinal side, a straight course is formed, particularly on a side opposite the strip material. Alternatively, the gripping devices may be moved back and forth between the proximal region and the distal region along a movement path, for example between end or holding points of a guide rail system, which in the sense applied here also corresponds to a closed movement path.

The gripping devices may grip the strip material at the edge on opposite sides of the strip material. The formation of the gripping connection between the gripping devices and the strip material may be limited to such an edge grip. Alternatively, edge gripping may only be provided on one side of the strip material.

The supply direction may be orientated horizontally. Alternatively, the supply direction may be orientated vertically or in an inclined position. In the embodiments, the folds each run transversely to the supply direction in the stack of the placed strip material.

Inserts may be arranged in at least a portion of the folds of the stack.

The inserts ultimately arranged in the folds of the placed strip material may be guided to the strip material before and/or after the gripping of the strip material by the gripping devices. The introduction of the inserts may take place before the zigzag folding, which begins with the gripping of the strip material by the gripping devices, is completed with the placement of the strip material. In the various embodiments, inserts may be supplied on one or both sides of the strip material. When guiding the inserts onto the strip material, which is to be folded or is already partially folded, the supply direction for the inserts may form an acute angle with the supply direction of the strip material. In the various embodiments, the inserts may be supplied with the aid of a transport system transporting the inserts, for example by means of transport systems which have transport directions, if inserts are to be supplied on both sides of the strip material.

The inserts may be guided to the strip material before and/or during the zigzag folding.

The inserts may be arranged such that they adhere to the strip material, before the strip material is placed in the stack. After supplying the inserts to the strip material to be folded, the inserts adhere on the surface of the strip material, wherein a suitable adhesive agent may be provided on the inserts and/or on the surface of the strip material. It is possible to dispense with providing an adhesion of the inserts on the strip material if the inserts guided onto the strip material remain on the strip material, for example due to gravity, whilst the strip material is folded. Also, the configuration with regard to the operating parameters of the folding device may be chosen in a suitable manner, in order to minimize or completely exclude the necessity for adhesion of the inserts on the strip material. In this context, the transport speed of the gripping devices and the oblique position of the straight connecting lines for the gripping devices with respect to the supply direction in particular are important.

The strip material may be a separating or separator material made from an electrically insulating material and the inserts may be electrodes, so that the stack is produced as a zigzag-folded stack with anodes, cathodes and separator. For example, lithium-ion battery cells may be produced in this manner. Not only when producing a zigzag-folded stack with anodes, cathodes and separator, but also when folding other strip materials, high folding speeds may be achieved using the suggested technologies. For example, the method may provide creating at least five folds per second or alternatively at least ten folds per second.

In connection with the apparatus for zigzag folding a strip material with inserts arranged in folds, the embodiments explained previously in connection with the method may accordingly be provided.

DRAWINGS

Further exemplary embodiments are explained in more detail in the following with reference to figures of a drawing. In the figures.

DETAIL DESCRIPTION

FIGS. 1 to 5 show schematic illustrations with a folding apparatus 1 for the zigzag folding of a strip material 2.

Figure 1:
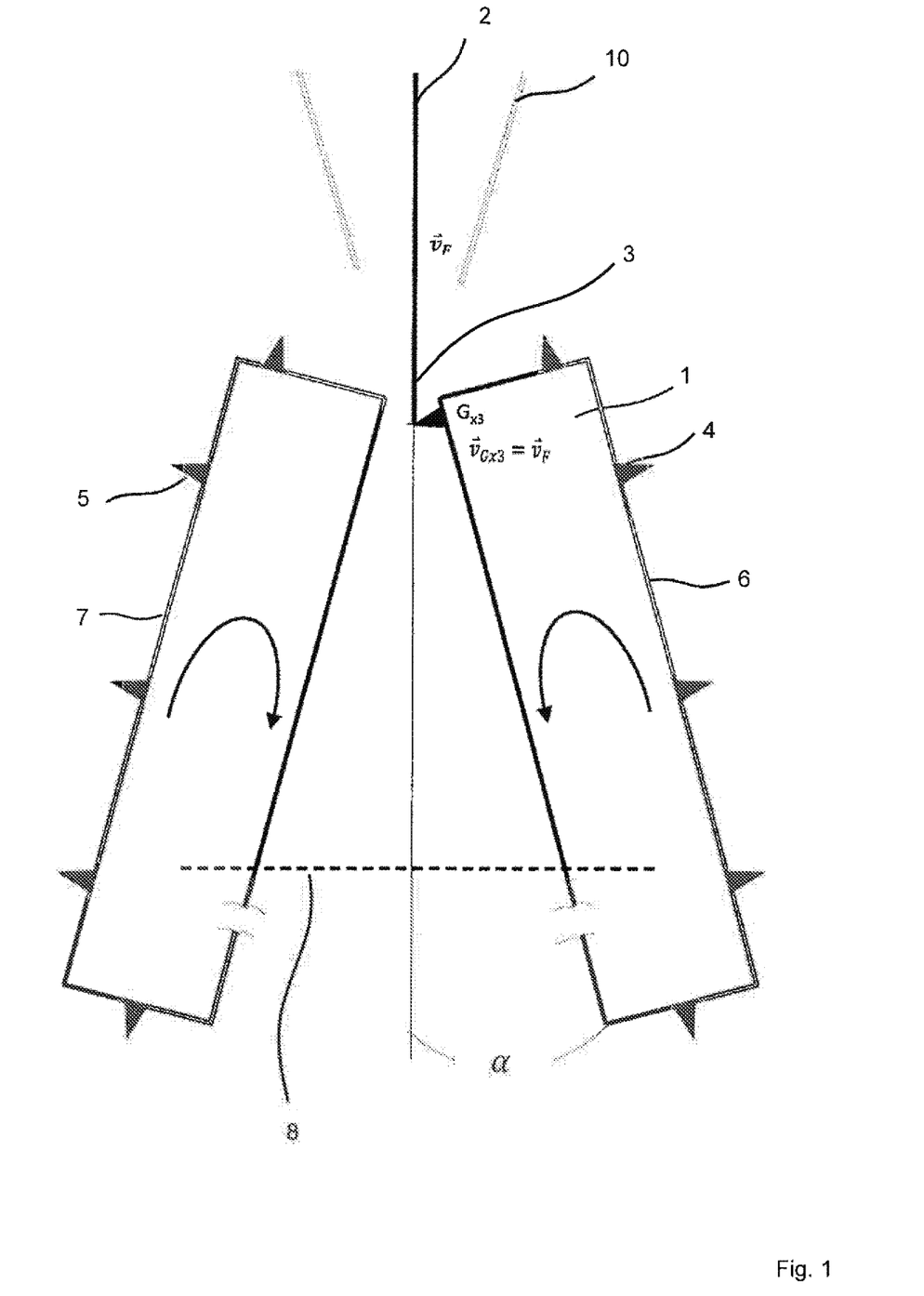
FIG. 1 shows a schematic illustration with a folding apparatus for the zigzag folding of a strip material with inserts arranged in folds, before the start of a folding process.

According to FIG. 1, the strip material 2 is supplied along a supply direction of the folding apparatus 1, wherein the supply direction is orientated vertically and parallel to the strip material in the exemplary embodiments illustrated. In a proximal region 3 of the folding apparatus 1, the strip material 2 to be folded is gripped, in order to then be folded.

For gripping and transporting the strip material 2 in the folding apparatus 1, on each of opposite sides of the strip material 2, a plurality of gripping devices 4, 5 are accommodated on an assigned transport system 6, 7 in such a manner that the plurality of gripping devices 4, 5 are each transported to the proximal region 3 in a circumferential manner and continuously on a closed movement path. The plurality of gripping devices 4, 5 are guided in the proximal region 3, spaced apart, to the strip material 2, in order to grip and to hold the strip material.

The movement path of the plurality of gripping devices 4, 5 is illustrated schematically in FIGS. 1 to 5. In an implementation, the movement path will rather run on a curved movement path in the region of the end faces of the transport devices 6, 7 which are to be differentiated from the longitudinal sides.

FIGS. 2 to 5 show the progress of the zigzag folding of the strip material 2 by means of the folding apparatus 1. Here, the plurality of gripping devices 4, 5 each move out of the proximal region 3 of the folding apparatus 1 into a distal region 8 of the folding apparatus 1, in order then ultimately to place the folded material in a stack 9 (cf. FIG. 5), in which the folds created run transversely to the supply direction of the strip material 2. A straight connecting line A between a position of the gripping device in the proximal region 2 and a position of the same gripping device in the distal region 8 of the folding apparatus 1 runs obliquely to the supply direction of the strip material 2, which is shown in FIGS. 1 to 5 by means of an angle $\alpha$.

Figure 2:
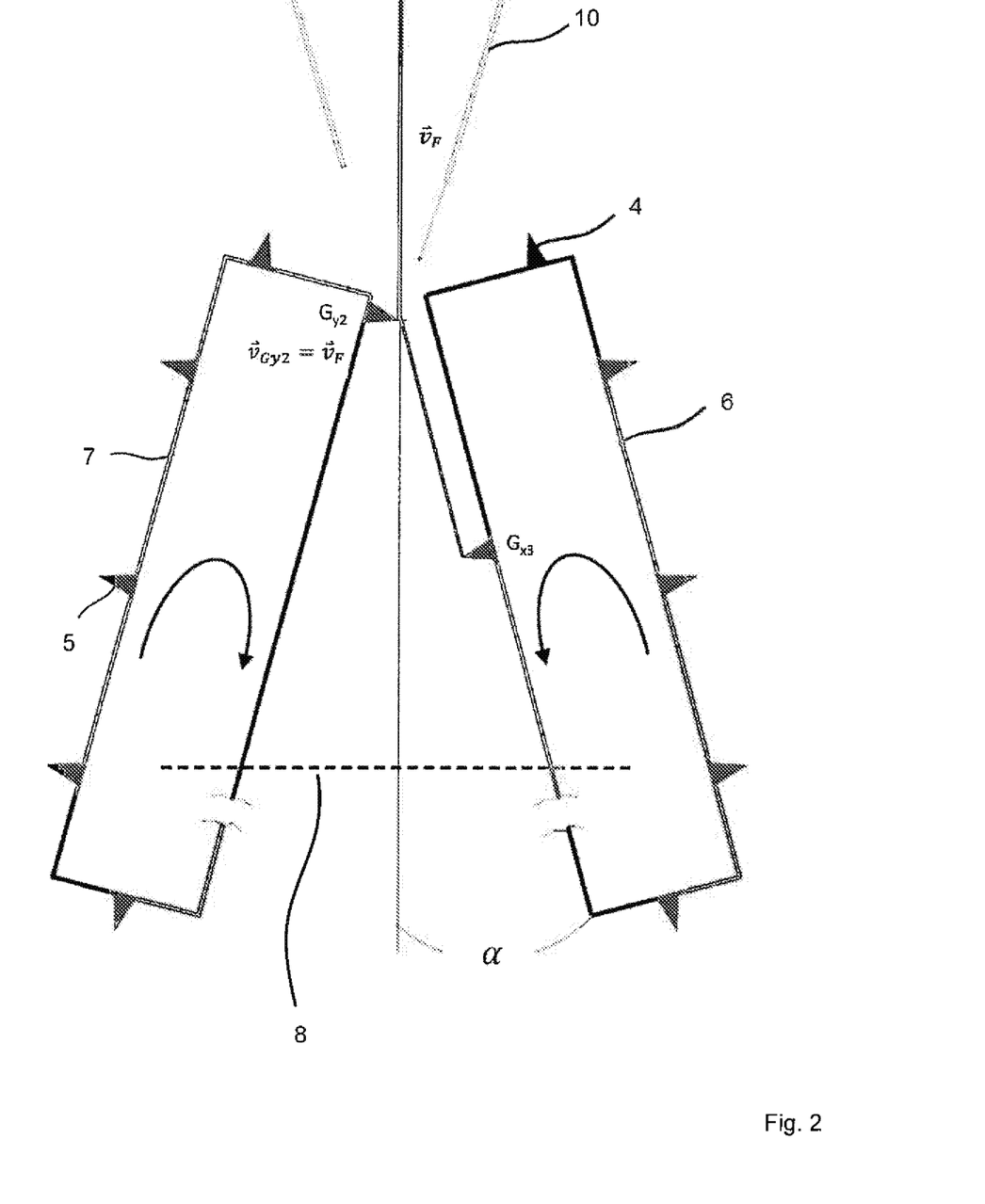
FIG. 2 shows a schematic illustration with the folding apparatus from FIG. 1 after the start of the folding process.
Figure 3:
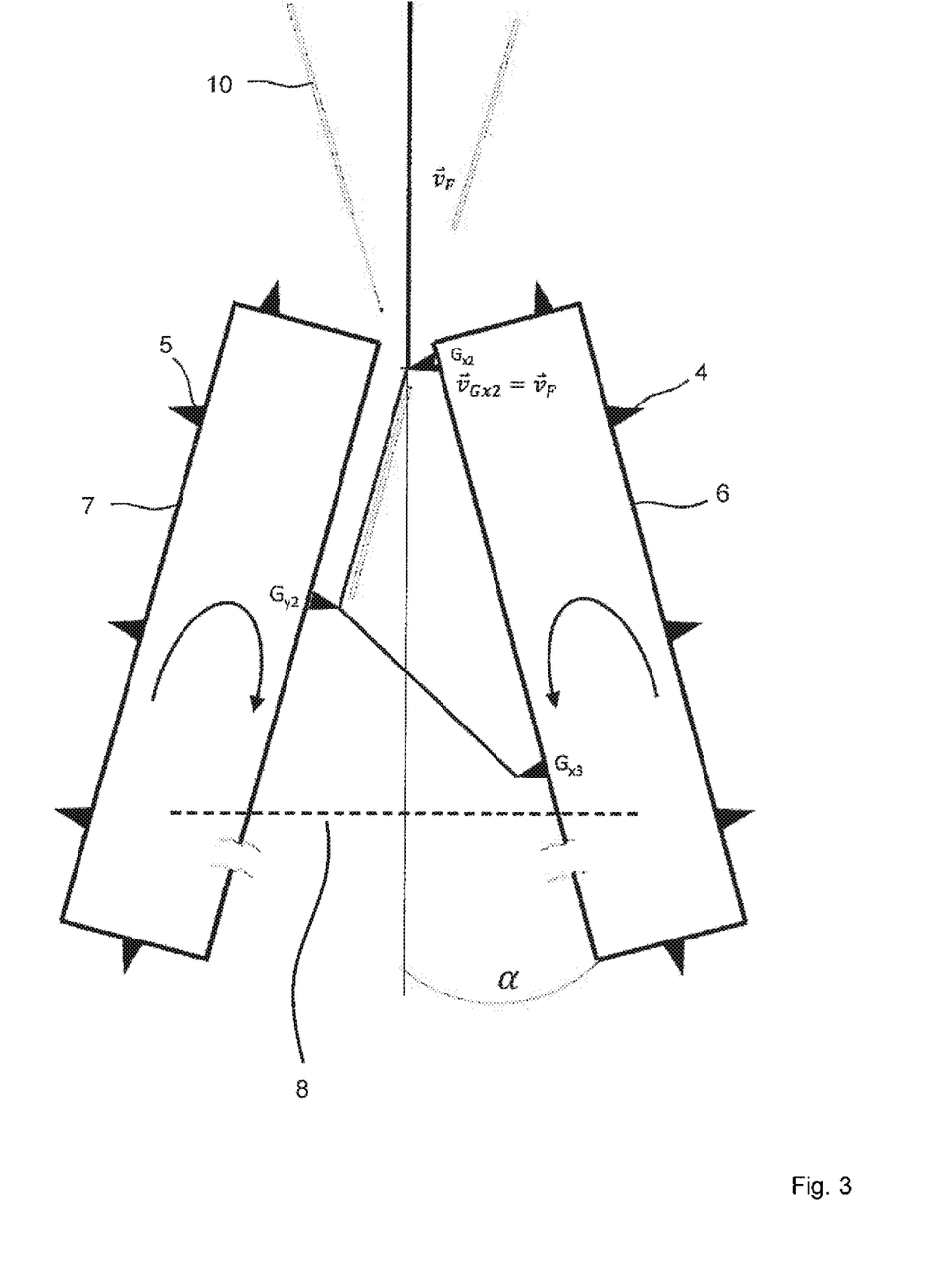
FIG. 3 shows a schematic illustration with the folding apparatus from FIG. 1 during the folding process, wherein an insert is arranged on the strip material to be folded.
Figure 4:
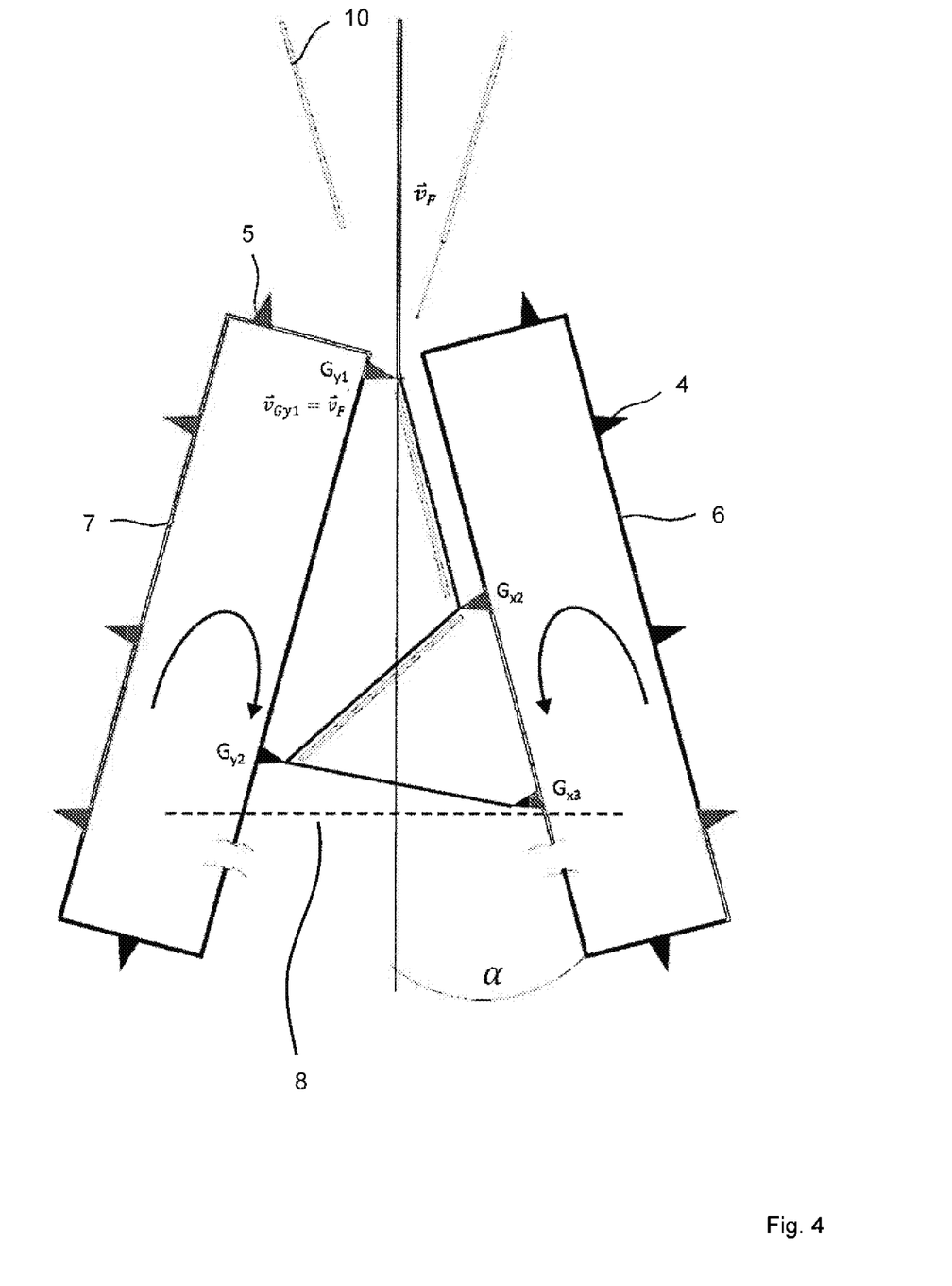
FIG. 4 shows a schematic illustration with the folding apparatus from FIG. 1 in an advanced state of the folding process, wherein a plurality of inserts are arranged on the strip material to be folded.

According to the illustration in FIG. 2, gripping devices $G_{x3}$ and $G_{y2}$ gripping adjacently or successively have a spacing along the separator web extending in a straight line therebetween, which spacing corresponds to the fold length.

In addition to the strip material 2, according to FIGS. 1 to 5, inserts 10 are supplied along a supply direction, which may run parallel to the longitudinal extent of the inserts and which, in the example shown, encloses an acute angle with the supply direction of the strip material 2. After the completion of the folding process, the inserts 10 are arranged in the stack 9 between the folds of the strip material 2. In order to localize the inserts 10 on the strip material 2 during zigzag folding, it may be provided that the inserts 10 adhere on the surface of the strip material 2, for example in that an adhesive agent, for example a glue, is arranged on the inserts 10 and/or on the surface of the strip material 2.

The described method may be used in order to produce battery cells from a folded separator material and cathodes and anodes arranged therebetween in an alternating manner.

The strip material 2 is then realized as a strip-shaped separator material. The inserts 10 are cathodes and anodes, which are supplied from the opposite sides of the strip material 2 to the strip material 2 and which have a flat shape for example. For example, a respective transport system may be used for this, for example on the basis of transport systems with counter-rotating rollers.

Figure 5:
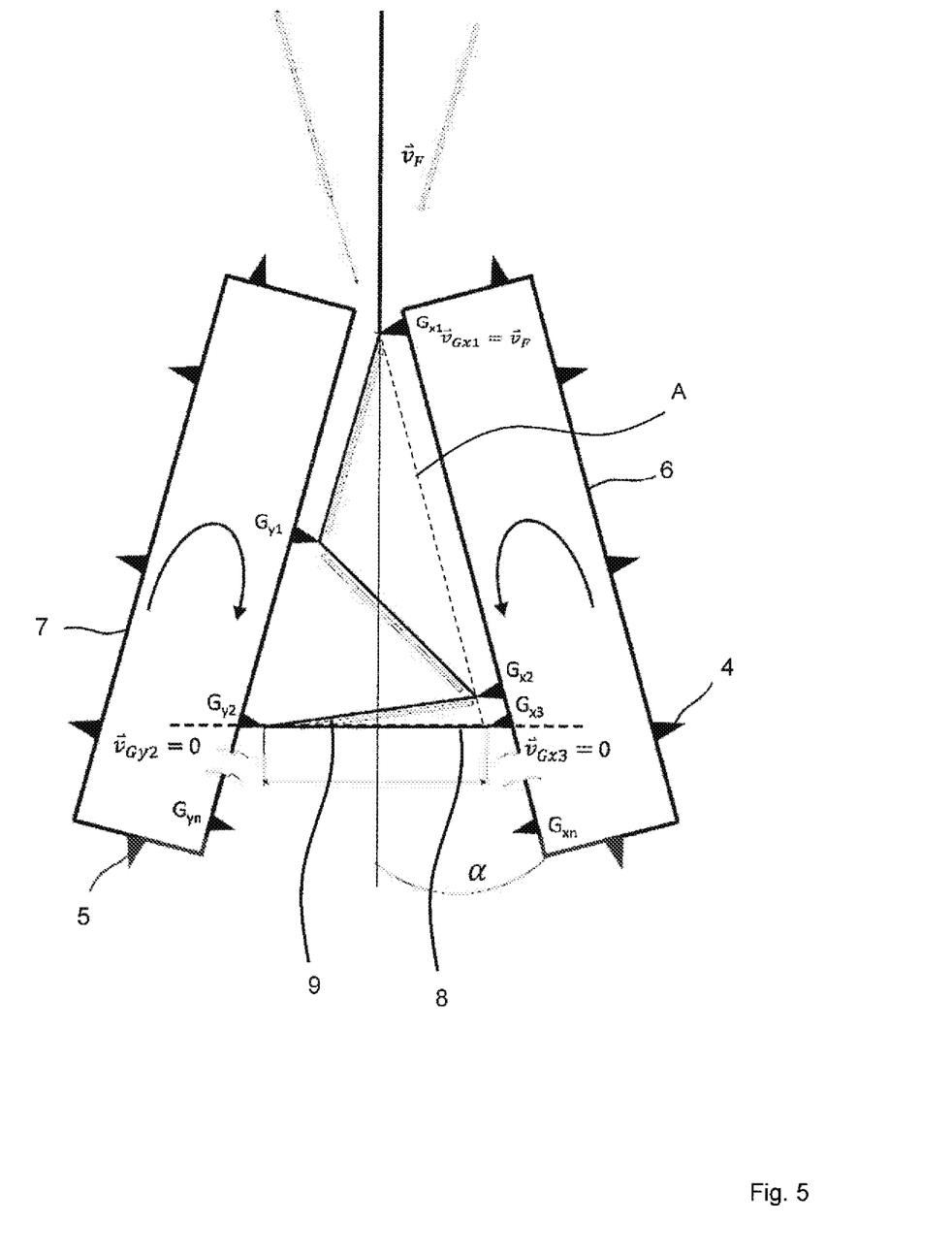
FIG. 5 shows a schematic illustration with the folding apparatus from FIG. 1, wherein the strip material to be folded is partly placed in a stack.

The described folding process is realized as a continuous process and for example makes it possible to create at least five folds per second in the stack 9. Also, a higher folding speed may be provided, for example the production of at least ten folds per second.

Figure 6:
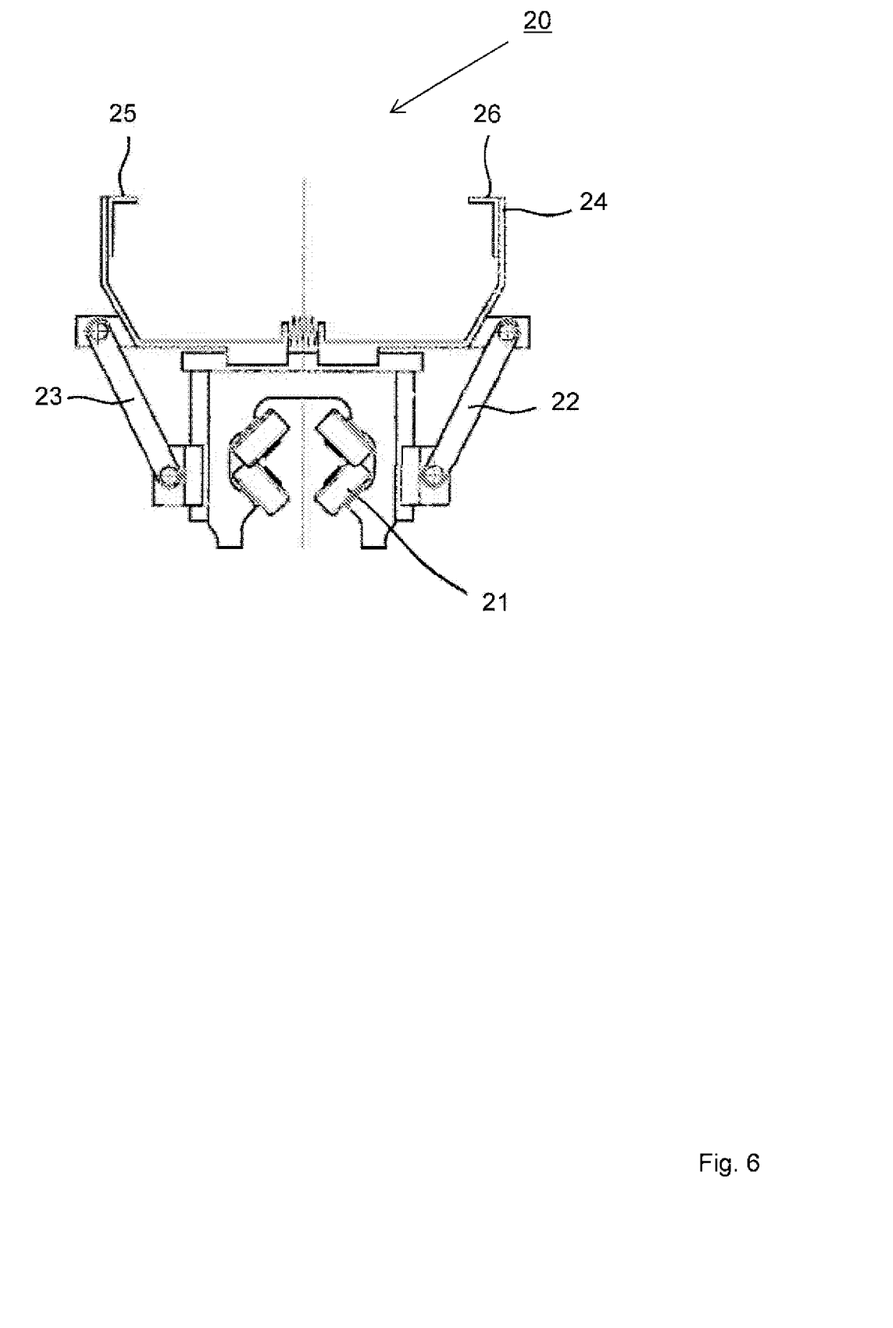
FIG. 6 shows a schematic illustration of a gripping device.

FIG. 6 shows a schematic illustration of a gripping device 20, which may be used for the plurality of gripping devices 4, 5. A storage system 21 with a plurality of rollers is provided, for example even six or twelve rollers, in order to accommodate the gripping device 20 on a transport system (not illustrated), which is set up to transport the gripping device 20 on a circumferential movement path. Actuatable lever arms 22, 23 are accommodated in a pivotable manner, in order to support the opening and the closing of a gripper 24 in which gripping arms 25, 26 are actuated for example by means of a force mechanism. Alternatively, it may be provided to actuate the gripper 24 by means of a motor or using a pneumatic cylinder. The gripping arms 25, 26 are set up to grip the strip material 2 to be folded at least at the edge.

The separator material to be folded may be pulled into the folding device 1 under tensile load as a strip-shaped continuous material with the speed $\vec{V}_F$. The folding device 1 has the at least two mutually opposite gripper systems, on the mirror axis of which the strip material 2 is guided. Each gripper system has n individual gripping devices 4, 5, which may be moved independently of one another. The guide path of the gripping devices 4, 5 is circumferential. The gripper systems are in each case inclined at the opening angle α to the supply direction. To create the folds, the grippers of the two gripper systems synchronize their speed to that of the strip material and fix the same in an alternating manner.

At the time of the engagement of the grippers with the strip material, there is no relative movement between the individual gripper and the film web ($\vec{V}_F = \vec{V}_{G(x,y)}$). Previously tailored anode material on one side and previously tailored cathode material on the other side are alternately supplied to the method as inserts 10. The electrodes may be placed on an as yet unfolded separator web and fixed on the separator web, for example by means of lamination or adhesive bonding. The separator web is subsequently folded. The anodes and cathodes, which were previously cut and placed onto the separator web, lie alternately in the folds as inserts 10.

The anode supplied to the method may be supplied simultaneously to pulling the fold along the guide path of the gripper system of the folding apparatus 1. The cathode may accordingly be supplied to the folding apparatus along the guide path of the gripper system.

The grippers, which are in contact with the strip material, continuously slow down their speed from the time of the fixing and thus brake the resulting zigzag-folded film structure with the fold length and reach the speed 0 ($\vec{V}_{Gx3} = \vec{V}_{Gy2}$ $\vec{V}_{F,B} = 0$) in the distal region 8. The resultant folds are continuously discharged from the folding apparatus by a mechanism. The gripping devices 4, 5 alternately release the contact with the material after the completion of the folding process and return on the circumferential guide path to the start of the folding process. The folds are therefore created without influencing the speed $\vec{V}_F$ of the separator material which is pulled in.

The features disclosed in the above description, the claims, and the drawing may be of significance both individually and in any combination for the implementation of the different embodiments.

The invention claimed is:

1. A method for zigzag folding a strip material, wherein the method has the following steps:
    continuously supplying a strip material to be folded to a folding apparatus along a supply direction,
    alternate gripping of the strip material in a proximal region of the folding apparatus by means of gripping devices, which gripping devices are guided from opposite sides of the strip material, and spaced apart, to the proximal region,
    holding and transporting the strip material by means of the gripping devices into a distal region of the folding apparatus, wherein the strip material is zigzag folded at the same time, and
    releasing of the strip material by the gripping devices and placement of the strip material in a stack with folds in the distal region, wherein the folds extend in the stack transversely to the supply direction,
    wherein, for each of the gripping devices, a proximal position of the gripping device during gripping of the strip material in the proximal region and a distal position of the same gripping device during the release of the strip material in the distal region are defined by a straight line that runs between the proximal position of the gripping device and the distal position of the gripping device and is diagonal to the supply direction, wherein a spacing between adjacent gripping devices is equal to a fold length, and
    wherein transport speeds for transporting the gripping devices towards the proximal region are adjusted independently of one another and are adapted to one another, and a supply speed for supplying the strip material to be folded with respect to the transport speeds for transporting the gripping devices are adjusted independently of one another and are adapted to one another, such that the gripping devices, when they are in contact with the strip material, continuously slow down the speed of the strip material from the time of gripping and thus brake the resulting zigzag folded strip material with the fold length and reach a speed of zero in the distal region without influencing the supply speed.

2. The method according to claim 1, wherein the gripping devices are guided on the opposite sides of the strip material, between the proximal position and the distal position, at least in sections, along a movement path which runs along the straight connecting line.

3. The method according to claim 1, wherein the gripping devices are guided on the opposite sides of the strip material by means of a respective transport device on a closed movement path from the proximal region, via the distal region, back again to the proximal region.

4. The method according to claim 1, wherein the gripping devices grip the strip material at the edge on opposite sides of the strip material.

5. The method according to claim 1, wherein the supply direction is orientated horizontally.

6. The method according to claim 1, wherein inserts are arranged in at least a portion of the folds of the stack.

7. The method according to claim 6, wherein the inserts are guided to the strip material before and/or during the zigzag folding.

* * * * *